Aug. 5, 1969   H. L. PASTAN   3,459,046
DIRECT READING PRESSURE GAGE
Filed Aug. 2, 1967   2 Sheets-Sheet 1
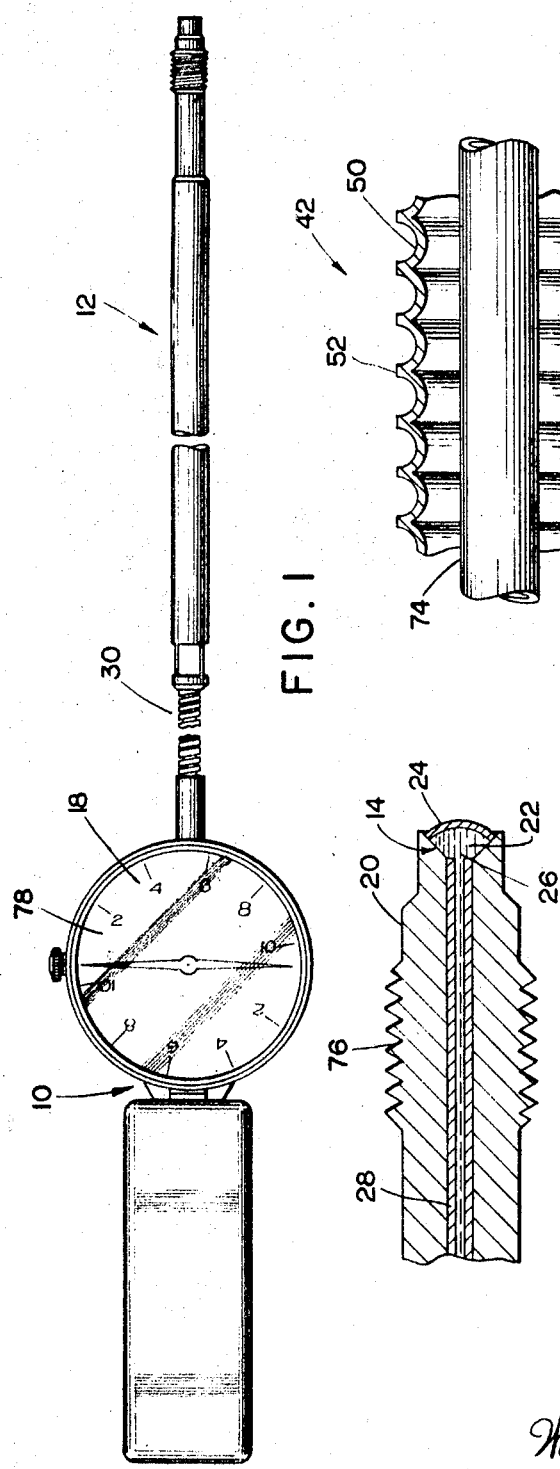
INVENTOR.
HARVEY L. PASTAN
BY
Wolf, Greenfield & Hieken
ATTORNEYS Aug. 5, 1969
H. L. PASTAN
3,459,046
DIRECT READING PRESSURE GAGE
Filed Aug. 2, 1967
2 Sheets-Sheet 2
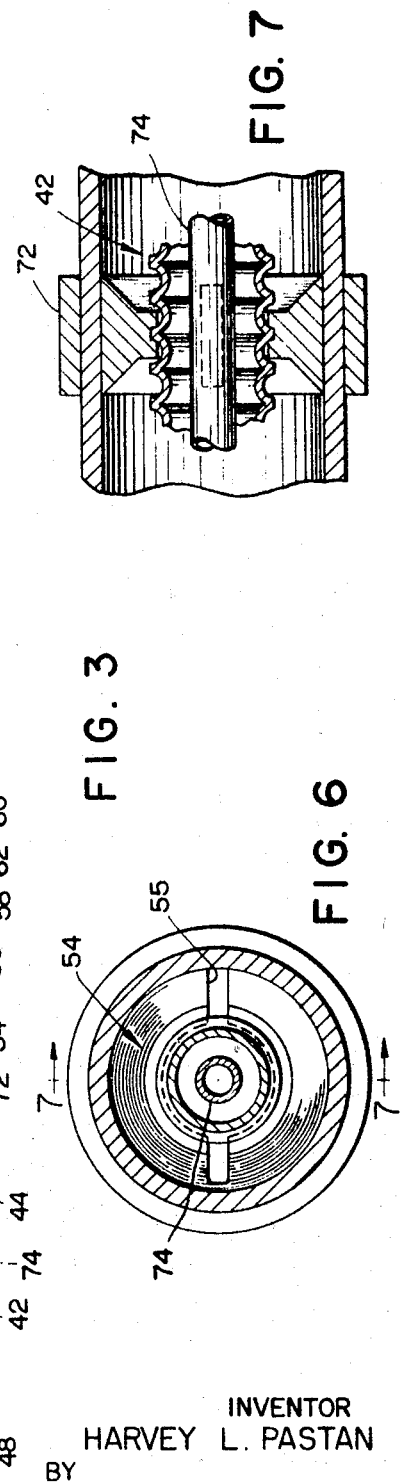
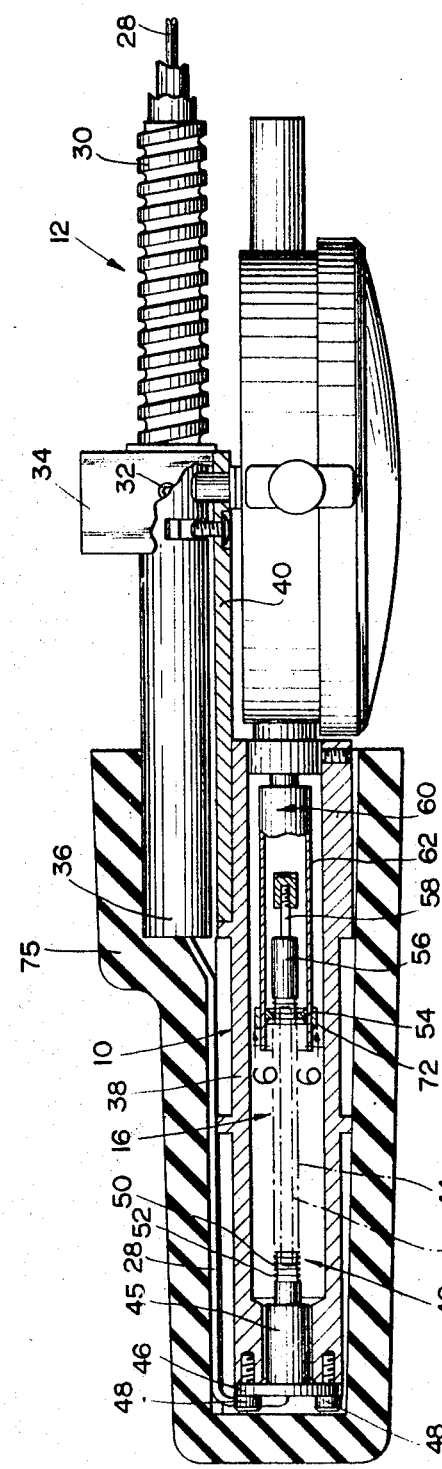
INVENTOR
HARVEY L. PASTAN
BY
*Wolf, Greenfield & Hicken*
ATTORNEYS

United States Patent Office 3,459,046
Patented Aug. 5, 1969

3,459,046
DIRECT READING PRESSURE GAGE
Harvey L. Pastan, Brookline, Mass., assignor to Microdot, Inc., Cambridge, Mass., a corporation of California
Filed Aug. 2, 1967, Ser. No. 657,909
The portion of the term of the patent subsequent to Oct. 31, 1984, has been disclaimed
Int. Cl. G01l 7/08
U.S. Cl. 73—406          8 Claims

ABSTRACT OF THE DISCLOSURE

A direct reading pressure gage with an elongated frame having a diaphragm coupler at one end and an elongatable chamber at the other connected by a capillary tube. A mechanical displacement gage responds to the change in chamber length to indicate the pressure applied to the diaphragm.

---

This invention relates to pressure gages and more particularly comprises a new and improved direct reading pressure gage.

The pressure gage of this invention is particularly designed for use in process control. Typically, the device may be used for measuring the melt pressure of thermoplastic materials during extrusion. The two most common types of instruments used for this purpose are the grease filled Bourdon tube gage and the flush diaphragm strain gage transducer. This latter type instrument is disclosed in my copending application Ser. No. 462,542, filed June 9, 1965 now Patent No. 3,349,623 and entitled Fluid Filled Pressure Transducer.

The most serious limitation of the commonly used Bourdon gage is that the gage fitting must be filled with grease. The grease may contaminate the material whose pressure is being measured, and/or it may lead to the discoloration of the material, which obviously produces quality problems when the material is plastic being extruded in special shapes for its end use. The flush diaphragm strain gage transducer does not have the problems of the Bourdon gage, but rather is an excellent device in process control such as for measuring the melt pressure, particularly where an electrical signal is required for remote indication or control. However, in many installations only a local indication of pressure is required, and there is a need for an economical means of displaying this information utilizing a flush diaphragm design.

The advantages of the flush diaphragm design are described in detail in my copending application, supra. Summarizing those advantages briefly, the flush diaphragm design provides a fluid filled pressure transducer that produces full scale deflection of the sensing device with a minimum volumetric displacement which minimizes the effect upon the fluid medium whose pressure is being measured. The minimum volumetric displacement also minimizes coupler deflection, and if the coupler is a diaphragm, the diaphragm deflection is maintained within the linear range.

One important object of this invention is to provide a direct reading pressure transducer with a minimum volumetric displacement. The total volume of the liquid fill in the gage is in the order of .004 cubic inch.

A more specific object of this invention is to provide means in a pressure transducer having minimum volumetric displacement for converting changes in pressure to linear motion.

Yet another important object of this invention is to provide a relatively inexpensive gage for providing local indication of melt pressure in an extruder.

Still another important object of this invention is to provide a direct reading pressure gage which is capable of operating without special cooling with the pressure coupler operating at temperatures up to approximately 750° F.

To accomplish these and other objects, the pressure transducer of this invention includes a body and an elongated frame extending from it. A coupler chamber including a diaphragm is provided at one end of the frame, and a capillary tube extends from the chamber through the frame to the body. A transducer element having an elongatable chamber is mounted on the body in communication with the other end of the capillary tube, and a liquid fills the chamber, capillary tube and elongatable chamber. A mechanical displacement gage is mounted on the body with its spindle secured to the elongatable chamber, and the displacement gage responds to the changes in length of that elongatable chamber.

These and other objects and features of this invention along with its incident advantages, will be better understood and appreciated from the following detailed description of one embodiment thereof, selected for purposes of illustration and shown in the accompanying drawing, in which:

FIG. 1 is a front view of a pressure gage constructed in accordance with this invention;

FIG. 2 is an enlarged fragmentary cross sectional view of the probe end of the gage shown in FIG. 1;

FIG. 3 is an enlarged fragmentary view, partly in section, of the sensing and read out end of the gage shown in FIG. 1;

FIG. 4 is a fragmentary cross-sectional view of the bellows employed as the sensing element in the gage of FIG. 1;

FIG. 5 is a fragmentary view of a portion of the mechanism shown in FIG. 3;

FIG. 6 is an enlarged detail of a component of the gage; and

FIG. 7 is a proprietary view, in section of a portion of the gage.

The gage shown in the drawings includes a body assembly 10, a frame 12, a coupler 14, and a sensor 16 including a standard dial indicator 18.

As is suggested in the introduction and described in my earlier copending application, supra, it is extremely desirable that minimum volumetric displacement occur over the full operative range of the transducer. In order to achieve this goal, the total fill of liquid in the device is kept in the order of approximately .004 cubic inch. The liquid, which necessarily should have a boiling point higher than the temperature to which the coupler 14 is to be exposed so as to prevent the production of extraneous pressure within the system, fills the coupler 14 that is defined in the probe end 20 of the frame 12. The coupler 14 is formed in part by a shallow cavity 22 at the exposed end of the frame, and the cavity 22 is closed by a thin, flexible, flat diaphragm 24 having a low spring rate. It is subjected to minimum stresses because it is completely supported on the inside by the fluid 26 which fills the cavity 22 and which is at the same pressure as the medium exerted against the diaphragm unlike diaphragms which are connected to and work against push rods, strain tubes or other similar devices in unfilled instruments, and operate under large stresses and are subject to diaphragm rupture.

A capillary tube 28 extends through the frame 12 including the flexible section 30. The flexible section 30 is provided to make it possible to expose the coupler to fluid mediums in relatively inaccessible points in a system. In the embodiment shown, the flexible section is made of a wire-type helical cable, but it is to be understood that other forms of flexible frames or jackets may be used for this purpose. The capillary which extends through the frame is itself thin and flexible so as to conform to the bending of the frame of the flexible section. The outer diameter of the capillary may be approximately .0625 inch, and the inner diameter may be approximately .010 inch.

The frame 12 is secured to the body assembly 10 by means of a set screw 32 which extends through the rectangular block 34 that forms part of the body assembly. The set screw 32 engages the outer jacket of the frame to secure it in place with the end 36 overlapping the sensing device 16.

The body assembly 10 includes a tube 38, a plate 40 welded to the tube, and the block 34 welded to the end of the plate. Disposed in the tube 38 is the sensing assembly 16 which includes the bellows element 42. The bellows 42 includes a main bellows section 44 on the end of which is brazed a collar 45 carrying a flange 46, and the flange 46 is secured to the end of the tube by cap screws 48. The capillary tube 28 is shown in FIG. 3 to extend beyond the end 36 of the frame 12 along the outside of the tube 38 and to turn about the flange 46 and is brazed or otherwise connected to the collar 45 so that its interior is in communication with the interior of the bellows section 44. The bellows 44 conforms to the configuration of the bellows shown in Li Patent No. 3,115,040 dated Dec. 24, 1963. Thus, the bellows is made of a plurality of generally cylindrical sections axially aligned and each inwardly convex in cross section. Each convolution 50 is bowed inwardly and is joined to the adjacent convolution at its outwardly extending edges 52. The bellows in cross section has the appearance of scalloped walls made of a series of cylindrical inwardly convex sections, unlike conventional bellows having cross sections which are sinusoidal in shape and dominantly inwardly concaved. Because of the configuration of the bellows, the forces against the convolutions resulting from internal pressure exerted against them is reflected in a change in length in the bellows when the pressure changes. In conventional bellows changes in pressure in the main produce a change in bellows diameter, which in accordance with this configuration of bellows the change of pressure results in a change in bellows length. The edges of the bellows serve as reinforcing rings to oppose bellows diameter change and therefore the change in pressure is reflected in a change in length. It is essential that a significant portion of the forces generated by the changes in pressure result in a change in length because of the very small volumetric displacement. In fact, a basic problem in such direct reading instruments is achieving a workable or usable displacement. In accordance with the present invention, approximately 50% of the pressure change is reflected in a change in bellows length. Thus, great utilization is made of the pressure changes.

The edges 52, which define what are effectively reinforcing rings, are each adapted to support a split inner ring 54 shown in FIGS. 3, 6 and 7. It will be noted in FIG. 6 that the split ring 54 sits on but one of the pair of edges 52 and is free of contact with the others. The inner ring 54 is split at 55 so that it may be opened and removed from one of the convolutions and mounted on another to provide adjustment. It is evident that when the ring is moved further away from the fixed end at collar 45 of the bellows, the ring 54 will move a greater distance in response to a given change in pressure. Thus, the instrument is calibrated by mounting the ring 54 on the proper edge 52. In FIG. 3 the ring 54 is shown to lie inwardly of the seal cap 56 of the bellows and the fill tube 58.

The inner ring 54 with the cap 56 and fill tube 58 lie within the flexure 60 which is shown in FIG. 5 to be composed of a tube 62 having several longitudinally extending splits 64. The closed end 66 of the tube 62 is integrally formed with a rod 68 having one or more flexures provided therein, and the threaded end 70 of the rod screws onto the end of the spindle (not shown) of the dial indicator 18. The dial indicator typically may be of standard design such as model No. E1K made by Federal Products Corporation.

The ring 54 carried by the bellows is secured to the flexure tube 62 by means of a C-clamp 72 which is shown in FIG. 3. An opening (not shown) in the tube 38 of the body 10 may be provided to allow tightening and loosening of the C-clamp 72 when it is positioned in the body to allow for assembling and disassembling of the gage. Thus it will be appreciated that elongation of the bellows 42 of the sensor 16 is transmitted to the dial indicator 18 through the ring 54 with the assistance of the C-clamp 72 and through the flexure 60.

To minimize the volume of liquid in the system and particularly in the bellows 42, a filler plug is disposed in the bellows and is floated in the liquid. The reduced volume of the liquid reduces the heat sensitivity of the gage to eliminate extraneous forces from being exerted on the spindle of the dial indicator. This is suggested in FIG. 4 wherein plug 74 is shown. Heat sensitivity is also reduced by the insulating jacket 75 shown in FIG. 3 to surround the body and sensor to maintain them at the same temperature and thereby eliminate any differential expansion between the sensor and body which would manifest itself in an extraneous displacement at the gage 18.

From the foregoing description it will be appreciated that the instrument shown in FIG. 1 may be used to render a direct reading of the pressure at such locations as the nozzle of a machine for extruding plastic material. The threaded section 76 of the frame 12 allows the end of the probe to be screwed into a threaded hole provided for this purpose, and the thin flexible diaphragm 24 may be exposed directly to the pressure of the plastic at the extruder nozzle. The very small volumetric displacement of the liquid 26 is carried through the capillary tube 28 and elongates the bellows 42. Thus the sensor 16 responds to the change in pressure exerted on the diaphragm 24 by an elongation of the bellows and a corresponding displacement of the spindle of the dial indicator 18. Thus, a direct reading may be taken of the pressure from the face 78 of the indicator. The dual numbering system on the face allows the gage to be read from either above or below. Adjustments may be made to provide full scale deflection of the indicator in the range of pressures being sensed by the diaphragm by means of the adjustment being provided at the flexure by the ring 54 and C-clamp 72. At lower pressure ranges, the ring and C-clamp may be moved toward the free end of the bellows to reflect in a greater deflection of the indicator spindle than would otherwise occur. On the other hand, if higher pressures are to be sensed by the coupler 14, the C-clamp and ring may be connected on the bellows closer to the fixed end of the bellows.

From the foregoing description, those skilled in the art will appreciate that the gage of this invention satisfies the several objects set forth in the introduction. It will also be recognized that numerous modifications may be made of this invention without departing from its spirit. Therefore, I do not intend to limit the breadth of this invention on the single embodiment illustrated and described. Rather, it is intended that the scope of this invention be determined by the appended claims and their equivalents.

What is claimed is:

1. A direct measurement pressure gage comprising a main body member,
   an elongated frame extending from the body member,
   a coupler chamber including a diaphragm provided in one end of the frame,
   a capillary tube extending through the frame to the body member and communicating at one end with the chamber,
   a sensor element having an elongatable chamber mounted in the body with the elongatable chamber in communication with the other end of the capillary tube, a liquid filling the chamber, capillary tube and elongatable chamber, and a gage mounted on the body and secured to the sensor element and having means responsive to changes in length of the elongatable chamber.

2. A direct measurement pressure gage as described in claim 1 further characterized by said elongatable chamber being a bellows capable of converting a substantial portion of changes in internal pressure to changes in its length.

3. A direct measurement pressure gage as described in claim 2 further characterized by a bendable section provided in the frame which the capillary tube passes permitting changes in the orientation of the coupler with respect to the body.

4. A direct measurement pressure gage as described in claim 3 further characterized by:

a connector joining one convolution of the bellows to the gage, and means for changing the particular convolution of the bellows to which the gage is connected.

5. A direct measurement pressure gage as described in claim 2 further characterized by:

means connecting one end of the bellows to the body assembly, means securing the gage on the body remote from the connection of the end of the bellows, an axially movable spindle forming part of the gage comprising the gage input, and an adjustable connection between one convolution of the bellows and the spindle.

6. A direct measurement pressure gage as described in claim 2 further characterized by:

said bellows comprising a series of inwardly convex series of convolutions connected directly together at their outer ends to define ring-like restraining bands.

7. A direct measurement pressure gage as described in claim 6 further characterized by:

clamping means removably secured to a single band and mountable separately on several of the bands and joining the bellows to the gage.

8. A direct measurement pressure gage as described in claim 1 further characterized by:

a heat insulating outer jacket surrounding the sensor element and the body to maintain them at the same temperature.

References Cited

UNITED STATES PATENTS

| 2,600,271 | 6/1952 | Schaevitz | 73—410 |
| 3,115,040 | 12/1963 | Li | 73—410 |
| 3,349,623 | 10/1967 | Pastan | 73—398 |

FOREIGN PATENTS

| 792,152 | 10/1935 | France. | |

LOUIS R. PRINCE, Primary Examiner

D. E. CORR, Assistant Examiner